United States Patent
Klovning et al.

(10) Patent No.: US 12,352,853 B2
(45) Date of Patent: Jul. 8, 2025

(54) ACOUSTIC PROXIMITY DETECTION FOR COMPUTERS WITH REDUCED POWER CONSUMPTION

(71) Applicant: Elliptic Laboratories ASA, Oslo (NO)

(72) Inventors: Espen Klovning, Strømmen (NO); Tom Øystein Kavli, Oslo (NO)

(73) Assignee: Elliptic Laboratories ASA, Oslo (NO)

( * ) Notice: Subject to any disclaimer, the term of this patent is extended or adjusted under 35 U.S.C. 154(b) by 88 days.

(21) Appl. No.: 18/278,969

(22) PCT Filed: Feb. 22, 2022

(86) PCT No.: PCT/EP2022/054410
§ 371 (c)(1),
(2) Date: Aug. 25, 2023

(87) PCT Pub. No.: WO2022/189141
PCT Pub. Date: Sep. 15, 2022

(65) Prior Publication Data
US 2024/0142615 A1    May 2, 2024

(30) Foreign Application Priority Data
Mar. 8, 2021 (NO) .................................. 20210304

(51) Int. Cl.
*G01S 15/04* (2006.01)
*G01S 15/32* (2006.01)
(Continued)

(52) U.S. Cl.
CPC ............ *G01S 15/04* (2013.01); *G01S 15/325* (2013.01); *G01S 15/876* (2013.01); *G06F 1/3231* (2013.01); *G06F 1/3287* (2013.01)

(58) Field of Classification Search
CPC ...... G01S 15/04; G01S 15/325; G01S 15/876; G01S 15/102; G01S 15/42; G06F 1/3231; G06F 3/017; G06F 3/043
See application file for complete search history.

(56) References Cited

U.S. PATENT DOCUMENTS 5,758,173 A      5/1998  Evoy
8,401,513 B2 *   3/2013  Langereis ............... G01S 15/06
                                                   381/174
(Continued)

FOREIGN PATENT DOCUMENTS

WO    WO-2011004135 A1    1/2011

OTHER PUBLICATIONS

Patent Cooperation Treaty, International Application No. PCT/EP2022/054410, "International Search Report," May 17, 2022, 2 pages.

*Primary Examiner* — John A Tweel, Jr.
(74) *Attorney, Agent, or Firm* — Bradley Arant Boult Cummings LLP

(57) ABSTRACT

The present invention relates to a proximity detection system and method for a computer or similar device. The computer includes at least two transducer units being capable of transmitting acoustic signals identifying the transducer within a predetermined frequency range. The transducer units are positioned at a distance from each other in said device, and at least one receiving transducer is capable of receiving acoustic signals within said frequency range and recognizing the transducer identification. The system is configured to measure the distance between each transducer unit and a reflecting object based on the transmitted and received signals based on the measured propagation time. The system is further configured to activate each of the transducer units and comparing the measured distance from each transducer unit thus calculating the (Continued)

direction of a reflecting object, and at the detecting of an object within a predetermined range of direction providing an activation signal to the device.

18 Claims, 1 Drawing Sheet

(51) Int. Cl.
  *G01S 15/87* (2006.01)
  *G06F 1/3231* (2019.01)
  *G06F 1/3287* (2019.01)

(56) References Cited

U.S. PATENT DOCUMENTS

| | | | |
|---|---|---|---|
| 10,185,543 B2* | 1/2019 | Vilermo | G06F 3/167 |
| 2013/0275872 A1 | 10/2013 | Kim et al. | |
| 2013/0301391 A1 | 11/2013 | Altman et al. | |
| 2016/0154089 A1 | 6/2016 | Altman | |
| 2017/0351345 A1* | 12/2017 | Nirjon | G06F 3/014 |
| 2018/0323783 A1 | 11/2018 | Bang et al. | |
| 2019/0122056 A1 | 4/2019 | Tran et al. | |
| 2019/0179476 A1 | 6/2019 | Strutt et al. | |
| 2019/0220112 A1 | 7/2019 | Thomas | |
| 2019/0302916 A1 | 10/2019 | Thomas | |

* cited by examiner

ACOUSTIC PROXIMITY DETECTION FOR COMPUTERS WITH REDUCED POWER CONSUMPTION

The present invention relates to a low power consumption proximity detection for computers or similar.

At the present, computers and similar devices are becoming advanced, and also complex including numerous different units and processes for giving the user an optimal and easy experience with the device. These processes and units, however, require power and add to the complexity and price of the device, as well as the chance of failure. One well known solution to reduce the power consumption is the sleep modes that are configured to be activated when the computer has been inactive for a predetermined amount of time. These modes often require an action from the user, e.g. moving the mouse or touching the keyboard, sometimes requiring entering a password, or by touching a fingerprint sensor. A more advanced solution is proposed in US2013275872A1, where acoustic sensors such as microphones are configured to sense the direction of a sound source, especially a voice, and activate a device when the user is in front of it. This, however, represents a complex, and thus power consuming, algorithm and may require dedicated units such as microphones as not every device is provided with more than one microphone and also not the necessary microphone quality. US2019220112 refers to a solution primarily including one transmitter and one transducer where the difference between directly transmitted signal path and reflected signal path is analyzed. Other solutions involving acoustic sensors related to computers and keyboards are mentioned in U.S. Pat. No. 5,758,173 and WO2011/004135.

The present invention relates a simple, low-cost system and algorithm that may be implemented into most computers and similar without additional hardware or units. This is obtained as specified in the accompanying claims.

The system and method according to the invention provides a solution being suitable for use in existing computers having two speakers and one or more microphones, wherein the speakers and microphone preferably are capable of operating with some sensitivity in the near ultrasound range. Each transmitted acoustic signal requires very low energy consumption and may even be reduced by using only one speaker until a reflection is received, and then adding the next speaker to see if the reflecting person is in the right position relative to the computer. This also enables the system according to the present invention to ignore a person positioned close to the computer but not in a position suitable for active use of the computer, thus saving power by remaining in sleep mode or similar.

The present invention is discussed below with reference to the use in computer, but may also be used for other applications such as detecting the presence of a user relative to projectors, smart boards where the user position relative to the device may be required to be within predetermined limits in order to activate the device.

The present invention will be discussed below with reference to the accompanying drawings, illustrating the invention by way of examples.

Figure 1:
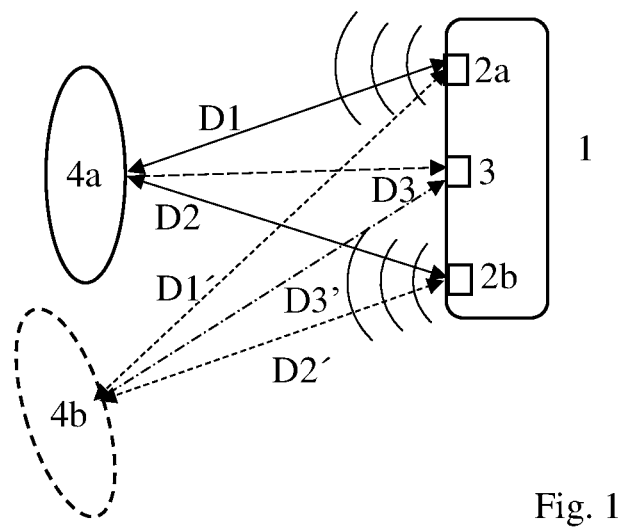
FIG. 1 illustrates a preferred embodiment of the device according to the invention as seen from above.

As can be seen from FIG. 1 an electronic device 1, such as a computer, a screen or similar, is provided with two transducers 2a,2b, typically with a distance between them in the range of at least 20-30 cm. In the illustrated example these transducers are loudspeakers being capable of transmitting signals outside the audible range. The transmitted acoustic signals may be reflected by a person 4a,4b within a predetermined distance range and be received by a receiver 3 positioned between the speakers, preferably a microphone also capable of receiving acoustic signals in the near ultrasound range. The receiver may also or alternatively be implemented in the transducers 2a,2b.

As is well known in the art e.g. related to sonars, a reflection will lead to a received signal detected at a time after the transmission time indicating the distance from the transmitter to the object 4a,4b and back. This is performed using an acoustic pulse short enough to provide a clear reflection signal so as not to give rise to interference between the transmitted and received signal. It is also possible to transmit pulses with predetermined characteristics, e.g. frequency range or profile, so that the system can recognize from which transducer it is transmitted, thus possibly shortening the time between the pulses and/or reducing the chances for interference between the signals. As stated above the allowed deviation from the predetermined activation position may be predetermined and adjusted by the user, but could be within the field of degrees in front of the computer.

Preferably the system in the device transmits the pulse and then opens the receiver for detecting the incoming signal within a time window corresponding to a predetermined distance range. For example, if the device according to the invention is a computer the time window may correspond to a distance between 25 cm and 1.5 m.

According to one embodiment of the present invention two distances D1, D2 are measured, as well as the difference between the distances, where the same transducers are used for both transmission and reception of the reflected signals. The measurements are performed in an alternating sequence so that one distance is measured at a time, avoiding interference between the signals. If the device has two speakers as illustrated in the drawing, one on each side, both will measure the same distance to the user if the user sits right in front of the device, e.g. by the keyboard in front of the computer. Thus, if two essentially similar distances D1, D2 are measured the device may be activated because there is a likelihood that the user 4a needs access to it. If two different distances D1', D2' are measured the device is not activated as the person is not in a position where the device will be used.

According to another embodiment one independent receiver 3 is used, where the measured distances will be D1+D3 and D2+03. However, if D3 is positioned in the middle between the speaker D3 is the same for both signals, and for all practical purposes the distances D1 and D2, and the difference between them, will be the main variable.

The allowed distances D1, D2 and difference between them may be chosen by the user depending on the device and the circumstances.

Figure 2:
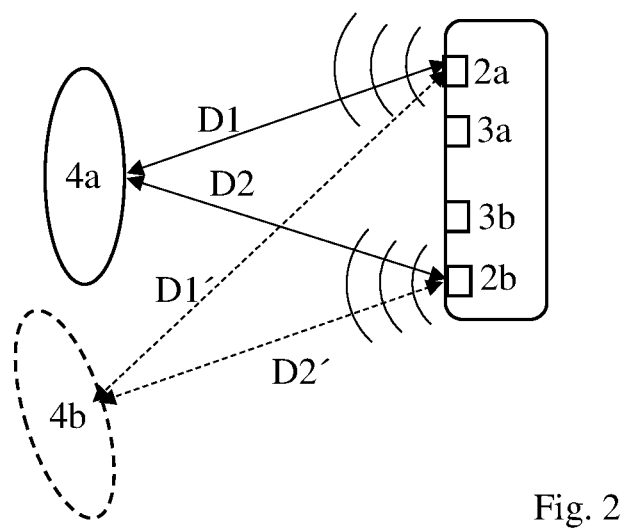
FIG. 2 illustrates an alternative embodiment of the invention.

In FIG. 2 a more complex configuration is illustrated with two receivers/microphones 3a,3b. By selecting the distance between them to be relatively short in relation to the applied wavelength ranges, typically 5-8 cm, this may add additional control over the direction measurements by using phase difference between the received acoustic signals.

As the transmitted acoustic signal may be reflected by stationary objects in the device vicinity the system may include a storage including previous measurements where the calculation unit is capable of comparing previous data with new measurements thus recognizing a change in the acoustic signal response and detecting the distance and position of the new object in the scene by comparing with the historic data.

An additional solution may be to analyze the frequency spectrum of the received signal compared to the transmitted signal in order to provide information about the new object, e.g. to distinguish a hard object, e.g. furniture, from a softer object, such as a person.

The present invention may thus be operated in a low power situation by emitting ultrasound pulses at chosen intervals until a reflection is received. The system may learn to recognize stationary reflectors by comparing with previous measurements and thus detect a new reflection in the scene.

In order to reduce the power consumption only one distance may be measured initially, activating the measurement of the second distance only when a reflecting object is detected. Then both distances are detected, and the system may be activated.

The activation may be performed in more steps. For example, the initial activation of the device may start an authentication routine, such as using a camera to do facial recognition, activate a fingerprint sensor, or a voice recognition, or deactivate sleep mode or activate keyboard illumination, or it may activate gesture and movement analysis using the alternative acoustic sensors or other sensors. It may also initiate connection with any other devices registered on a registered user, such as a mobile phone, using Bluetooth, Wi-Fi or acoustic signals being received and acknowledged by the device. Alternatively or in addition the detected presence of an electronic transmitter such as a mobile phone, using Bluetooth, Wi-Fi or acoustic signals being recognized by the device according to the invention may be used to activate the proximity sensing according to the invention.

The operation of the present invention may in one embodiment follow the following steps:
1) Transmitting, at a predetermined rate, an acoustic signal in the near ultrasonic range from at least one of the transducers in the system. The acoustic may be encoded or having known characteristics such as frequency range and distribution, chirps, time stamps, etc, so as to be easily recognized by a receiver.
2) Monitoring with a receiver, such as a microphone, the predetermined wavelength range, for a reflected signal having the predetermined characteristics.
3) In an alternating sequence transmitting signals from two transducers, logging the transmission time and detection time and comparing these to the time of arrival at the receiver. The receiver is able to distinguish between the transmitted signals e.g. by selected time windows or by signal characteristics.
4) At a receipt of signals from both transducers the system calculates the differences in propagation time for each signal from transducer to reflecting object and back to the receiver.
5) At a propagation time difference being less than a predetermined limit the system may assume the presence of a user in front of the computer and may activate the computer, screen or other chosen parts of the system.

The process and system described above may in some cases have certain variations. For example, the receiver may be related to or even be implemented in one or both the transmitting transducers, e.g. being capable of emission and receipt with the same unit. If one such transducer is used the system may be calibrated accordingly as the propagation time from the other transmitter may be longer than the propagation time from the first transducer and back when the user is in front of the device. It is also possible to use two transducers capable of both transmitting and receiving, each measuring the distance to the object.

The signals from each transducer may be time stamped or encoded, e.g. with different frequency and/or amplitude profiles so that the receiver is able to differentiate between them to measure the separate distances. This way it is also possible to transmit and receive the signals from the transducers simultaneously.

As the number of transducers may depend on the available hardware the present invention describes a solution where different ultrasound signals (e.g. different sines, chirp signals, arbitrary modulation or any combination of these signals) are played from a subset of speakers where a subset is one or more speakers, or alternatively the same signal can be played time shifted on a subset of speakers where a subset is one or more speakers.

With different signals, or time shifted signals from different subsets of speakers, processing the echos in the incoming ultrasound data from one or more ultrasound sensors (e.g. microphones, transducers, etc) allows the system to discriminate the signal coming from one subset of speakers from the signal coming from the other subset of speakers. It will thus be possible to determine position of user presence, user movement, user location and user gestures along or parallel to the axis through the different speaker subsets. At any time, the system may use some but not all the audio output components (i.e. speakers, ear-piece receivers, etc) on a particular device.

The benefit of using different ultrasound signals from different active subsets of speakers is that it allows for new platform designs where use of a single ultrasound sensor (e.g microphone, transducer, etc) or a configuration where separation of two or more ultrasound sensors and their location is of less importance. In addition, on most devices supporting acoustic playback, the speakers have maximum separation for stereo quality reasons. On laptops, speakers are usually separated by 20-30 cm while the microphones are only separated by 5-8 cm. With speakers well separated, for instance on each side of the keyboard or on the sides under the laptop, overall performance for swipes and other gestures can be improved significantly. The benefit of using two speakers instead of two mics is that the speakers on a laptop are normally more separated in distance, giving potentially more accuracy in direction estimates.

To summarize the present invention relates to a system and method, as well as a corresponding computer implemented method, for proximity detection system for a computer or similar device, the device including at least two transducer units being capable of transmitting acoustic signals within a predetermined frequency range and time period, and are positioned at a distance from each other in said device. The system also includes at least one receiving transducer being capable of receiving acoustic signals within said frequency range, and the system is configured to measure the distance between each transducer unit and a reflecting object based on the transmitted and received signals based on the measured propagation time, preferably using a well-known pulse echo technique.

The system is according to one embodiment configured to activate each of the transducer units in an alternating time sequence, simultaneously or alternating, and comparing the measured distance from each transducer unit to the object and calculating the direction of a reflecting object based on the difference between the distances. When the object is found to be within a predetermined range of directions the system may provide an activation signal to the device. This way the device may be activated from a sleep mode or similar when the user is in the right position relative to the computer, but not if someone sits on the side, outside the usable range of positions for using the computer. Preferably the activation requirement also takes the distance from the device into account, defining the usable range within a predetermined angle and distance from the device.

As an alternative to or in addition to the alternating time sequence the transducers may transmit different waveforms, e.g. an encoded signal, making it possible for the system to recognize the signal from each transducer and thus the position from which each signal is transmitted.

The system may be based on an ordinary computer where said two transducer units are constituted by stereo speakers each transmitting said acoustic signals, and the at least one receiving transducer is/are constituted by a microphone for receiving the signals.

As an alternative, at least one of the transducers are adapted to both transmit and receive said acoustic signals, the transmitting and receiver transducer thus being constituted by the same transducer unit and may be configured to recognize and extract its own signal from the received signals.

In order to not disturb the user the utilized frequency range is out of the audible range, preferably the frequency range is in the near ultrasound range, e.g. between 20 and 30 kHz, preferably between 20 and 25 kHz. This may depend on the transducer in the relevant case.

As stated above, the process may be started by the receipt of recognized electromagnetic or acoustic signals, e.g. Bluetooth or Wi-Fi, or the activation may be concluded based on similar signals recognizing the presence for example of the user phone.

Preferably the calculation means including a storage means for storing a historic set of recorded reflections representing an inactive status, where the calculation means thus being capable of detecting a new, reflecting object and thus calculating the direction to the new object.

The method according to the invention for detecting an object or person in a position in front of a device, where as stated above the device includes at least two transducer units and being configured to measure the distance from each of said transducers and the object. The method and/or the computer implemented software product performing the method includes performing the following steps:

a. Transmitting a first acoustic signal from a first known position at a known time.
b. At the receipt of a reflection of said first acoustic signal registering a first propagation time between the transmission and receipt of the first acoustic signal.
c. Separately or simultaneously transmitting a second acoustic signal from a second known position at a second known time.
d. At the receipt of a reflection of said second acoustic signal registering a second propagation time between the transmission and receipt of the second acoustic signal.
e. Calculating the differences between said propagation times and, when said difference is less than a predetermined value, providing an indication that the reflecting object is within a range of certain directions and activating predetermined features in the device.

The calculation will preferably also include the detection of the distance of the object from the device, said activation being indicated when the object is within a predetermined range.

The invention claimed is:

1. A proximity detection system of an electronic device, the proximity detection system comprising:
   at least two transducer units being capable of transmitting acoustic signals identifying the transducer unit within a predetermined frequency range, the at least two transducer units being positioned at a distance from each other in the electronic device, and at least one receiving transducer being capable of receiving acoustic signals within the frequency range reflected from an object;
   wherein the proximity detection system is configured to recognize the transducer identification and to measure the distance between each transducer unit and the reflecting object based on the transmitted and received signals based on the measured propagation time of the received reflected signal;
   wherein the proximity detection system is configured to activate each of the transducer units in a predetermined time sequence and compare the measured distance from each transducer unit to the reflecting object, thus calculating the direction to the reflecting object, and at the detection of the object within a predetermined range of directions providing an activation signal to the electronic device;
   wherein the transducer units are activated in an alternating sequence, the identification being defined by the sequence; and
   wherein the proximity detection system is configured to activate the predetermined features of the electronic device when the distance and direction is within predetermined limits.

2. The proximity detection system according to claim 1, wherein the signals from each of the transducer units are encoded so as to identify the transducer unit.

3. The proximity detection system according to claim 2, wherein the signals are transmitted simultaneously.

4. The proximity detection system according to claim 1, wherein the two transducer units are constituted by speakers transmitting the acoustic signals, and the at least one receiving transducer is/are constituted by a microphone for receiving the signals.

5. The proximity detection system according to claim 1, wherein one of the transducer units is adapted to both transmit and receive the acoustic signals, the transmitting and receiver transducer thus being constituted by the same transducer unit.

6. The proximity detection system according to claim 1, wherein the proximity detection system is configured to initially utilize only one of the transducer units for measuring a distance to a user and to initiate alternating sequence at the detection of a reflecting object.

7. The proximity detection system according to claim 1, wherein the predetermined features comprise connection with other devices.

8. The proximity detection system of claim 7, wherein the connection with other devices is selected from the group consisting of WiFi, Bluetooth, and ultrasound.

9. The proximity detection system according to claim 4, wherein the activation comprises the validation through at least one of password, biometric measurements, Bluetooth, and Wi-Fi.

10. The proximity detection system according to claim 1, comprising a storage for storing a historic set of recorded reflections representing an inactive status, the proximity detection system being capable of detecting a new reflecting object and thus calculating the direction to the new object.

11. A method for detecting an object in a position relative to an electronic device, the electronic device comprising at least two transducer units and being configured to measure the distance from each of the transducers and the object, the method comprising:
   a. transmitting from a first transducer a first acoustic signal identifying the first transducer from a first known position at a known time;
   b. transmitting from a second transducer a second acoustic signal identifying the second transducer from a second known position at a second known time;
   c. at the receipt of a reflection of the acoustic signals, registering a first and second propagation time between the transmission of the first and second acoustic signal and receipt of the acoustic signals;
   d. calculating the differences between the propagation times and, when the difference is less than a predetermined value, providing an indication that the reflecting object is within a range of certain directions and activating predetermined features in the electronic device; and
   e. activating predetermined features in the electronic device when the distance and direction to the reflecting object are within predetermined limits.

12. The method according to claim 11, wherein the calculating comprises detecting the distance of the object from the electronic device, the activating being indicated when the object is within a predetermined range.

13. The method according to claim 11, wherein one of the transducer units is adapted to both transmit and receive the acoustic signals, the transmitting and receiver transducer thus being constituted by the same transducer unit.

14. The method according to claim 11, wherein step b is performed only if a reflection is detected from the first signal.

15. The method according to claim 11, wherein the calculating comprises storing a historic set of recorded reflections representing an inactive status, thus detecting a new, reflecting object and calculating the direction to the new object.

16. A computer-program product comprising a non-transitory computer-usable medium having computer-readable program code embodied therein, the computer-readable program code adapted to be executed to implement the method of claim 11.

17. The proximity detection system according to claim 6, wherein the near ultrasound range is between 20 kHz and 30 kHz.

18. The proximity detection system according to claim 17, wherein the near ultrasound range is between 20 kHz and 25 kHz.

* * * * *